United States Patent
Sohn

(10) Patent No.: US 7,117,304 B2
(45) Date of Patent: Oct. 3, 2006

(54) SYSTEM AND METHOD FOR DETERMINING A FILE SYSTEM LAYOUT

(75) Inventor: Susan Sohn, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 413 days.

(21) Appl. No.: 10/626,122

(22) Filed: Jul. 23, 2003

(65) Prior Publication Data

US 2004/0250014 A1    Dec. 9, 2004

Related U.S. Application Data

(60) Provisional application No. 60/475,675, filed on Jun. 3, 2003.

(51) Int. Cl.
*G06F 12/00* (2006.01)
(52) U.S. Cl. ............... 711/112; 711/170; 711/171; 711/172; 711/173; 707/7
(58) Field of Classification Search ............... 711/111, 711/112, 170, 171, 172, 173; 707/7, 200, 707/205
See application file for complete search history.

(56) References Cited

U.S. PATENT DOCUMENTS

| | | | | |
|---|---|---|---|---|
| 5,435,004 A | * | 7/1995 | Cox et al. | 707/205 |
| 5,675,769 A | * | 10/1997 | Ruff et al. | 711/173 |
| 5,887,164 A | * | 3/1999 | Gupta | 713/2 |
| 6,000,023 A | * | 12/1999 | Jeon | 711/173 |
| 6,088,778 A | * | 7/2000 | Ruff et al. | 711/173 |
| 6,108,759 A | * | 8/2000 | Orcutt et al. | 711/173 |
| 6,138,179 A | * | 10/2000 | Chrabaszcz et al. | 710/10 |
| 6,173,360 B1 | * | 1/2001 | Beardsley et al. | 711/111 |
| 6,185,575 B1 | * | 2/2001 | Orcutt | 707/200 |
| 6,192,471 B1 | * | 2/2001 | Pearce et al. | 713/2 |
| 6,253,300 B1 | * | 6/2001 | Lawrence et al. | 711/173 |
| 6,366,911 B1 | * | 4/2002 | Christy | 707/7 |
| 6,453,383 B1 | * | 9/2002 | Stoddard et al. | 711/112 |

OTHER PUBLICATIONS

Tony Harris and Kristian Koehntopp, "Linux Partition How to," Sep. 1, 2000, http://cayanet.dnsalias.org/documentation/Linux/en/minihowtos/pdf/Partition.pdf.*

* cited by examiner

*Primary Examiner*—Donald Sparks
*Assistant Examiner*—Yaima Campos
(74) *Attorney, Agent, or Firm*—Martine Penilla & Gencarella, LLP

(57) ABSTRACT

Embodiments of the present invention include a method for determining a file system layout on a disk. The method includes providing a default file system layout comprising a root partition, a swap partition and a plurality of unassigned partitions. The method further includes assigning a size for each of the partitions, sorting the partitions by size from largest to smallest and identifying available blocks on the disk for the unassigned partitions. The method also includes assigning locations on the disk for the partitions from the largest to the smallest wherein the partitions are filled in the available blocks from end to beginning.

12 Claims, 10 Drawing Sheets

SYSTEM AND METHOD FOR DETERMINING A FILE SYSTEM LAYOUT

CROSS REFERENCE TO RELATED APPLICATIONS

This application claims priority to the co-pending U.S. Provisional Patent Application No. 60/475,675 entitled "A System And Method For Determining A File System Layout" by Susan Sohn, filed Jun. 3, 2003 and is also incorporated herein by reference.

BACKGROUND OF THE INVENTION

1. Field of the Invention

The present invention relates to a data processing. More particularly, the present invention relates to a system and method for determining a file system layout on a disk.

2. Description of the Related Art

Modern multi-user/multi-tasking computer systems run complex operating systems to accomplish concurrent executions of myriad user applications. Broadly speaking, an operating system may be defined as system software that schedules tasks for execution by one or more processing units in the computer system, allocates storage among various application programs, handles the system interface to the peripheral hardware, and presents a default interface to the user when no application program is running. When first installing an operating systems onto a data processing system, many times a file system layout is determined by the installation program that is installing the operating system. Frequently, users desire the freedom to preserve data that may already be stored on a particular data storage device. In addition, many users desire the freedom to customize the file system layout to a particular configuration. Prior Art FIG. 1 is an illustration of a conventional disk 100 that has preserved slices 120 and free slices 110. A free list 130 is a vector of free space on conventional disk 100.

Unfortunately, conventional approaches to file system layout that allow preservation of partitions on a disk do not allow modification of the file system layout in megabytes. Most conventional approaches use cylinders to measure the size of a disk (e.g., free space and used space). When partitions are preserved, calculations of the sizes of free and available space become difficult. Rounding errors involved in converting cylinders to megabytes and vice versa can cause errors such as overlapping partitions on the disk.

SUMMARY OF THE INVENTION

Therefore, it is desirable to have a system for determining a file system layout that allows user modification. Furthermore, it is desirable to have a system for determining a file system layout that allows preservation of partitions and modification to a file system layout in both megabytes and cylinders.

Accordingly, what is needed is a system and method for determining a file system layout on a disk that facilitates modification of the layout with a graphical interface. In one aspect, the invention should provide a default file system layout and allow modification to the default file system layout with a graphical interface. The graphical interface should allow modification in both cylinders and megabytes, even if a partition is preserved on the disk.

A system and method for determining a file system layout is provided. Embodiments of the present invention include a method for determining a file system layout on a disk. The method includes providing a default file system layout comprising a root partition, a swap partition and a plurality of unassigned partitions (e.g., free space). The method further includes assigning a size for each of the partitions, sorting the partitions by size from largest to smallest and identifying available locations on the disk for the unassigned partitions. The method also includes assigning locations on the disk for the partitions from the largest to the smallest wherein the partitions are filled in the available space from end to beginning.

Embodiments of the present invention also include a system for determining a file system layout on a disk. The system includes a disk coupled to a bus and a processor coupled to the bus for determining a default file system on the disk. The system further includes a graphical user interface for modifying the default file system layout, including preserving one or more partitions and modifying the default file system layout in both megabytes and cylinders.

These and other objects and advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
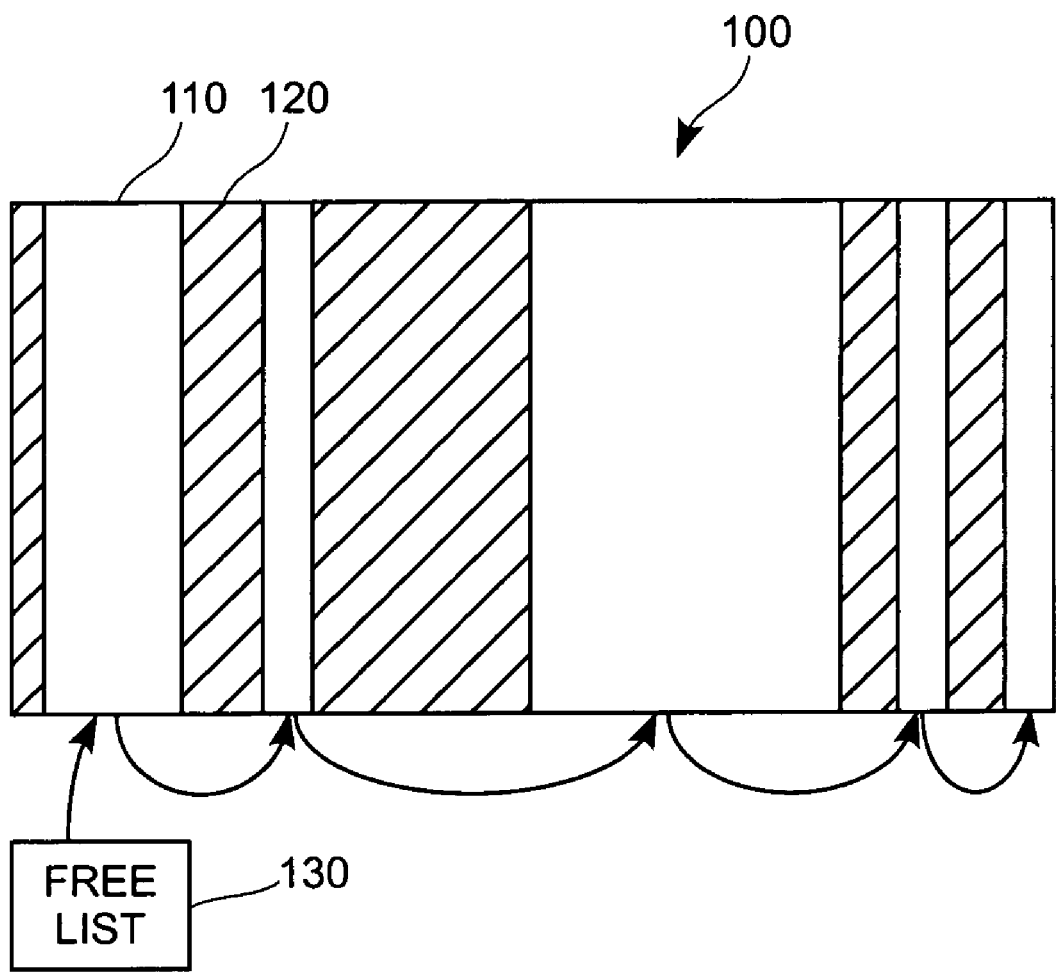
FIG. 1 is a prior art illustration of a conventional disk comprising preserved slices and free slices.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sorting," "determining," "retrieving," "providing," "sending," "converting," "identifying," or the like, refer to the action and processes (e.g., process 900) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Although the system and method for determining a file system layout of the present invention may be implemented in a variety of different electronic systems such as a desktop computer system, an embedded system, etc., one exemplary embodiment includes the implementation on a computer server system.

Figure 2:
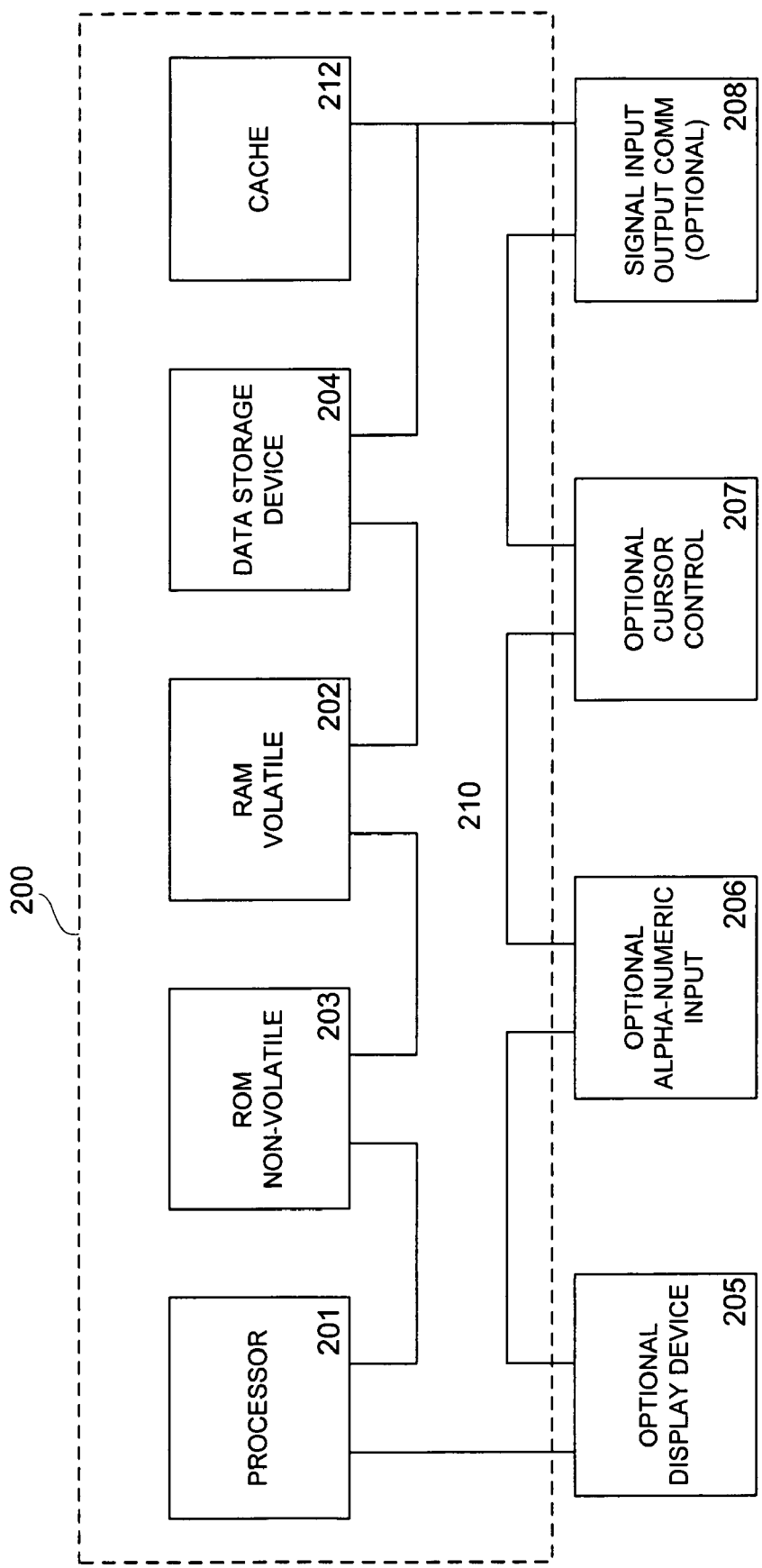
FIG. 2 is a logical block diagram of an exemplary computer system in accordance with an embodiment of the present invention.

Referring now to FIG. 2, a block diagram of exemplary computer server system 200 is shown. It is appreciated that computer system 200 of FIG. 2 described herein illustrates an exemplary configuration of an operational platform upon which embodiments of the present invention can be implemented (e.g., GUI 305 of FIG. 3). Nevertheless, other computer systems with differing configurations can also be used in place of computer system 200 within the scope of the present invention.

Computer system 200 includes an address/data bus 210 for communicating information, a central processor 201 coupled with bus 210 for processing information and instructions, a volatile memory unit 202 (e.g., random access memory, static RAM, dynamic RAM, etc.) coupled with bus 210 for storing information and instructions for central processor 201 and a non-volatile memory unit 203 (e.g., read only memory, programmable ROM, flash memory, EPROM, EEPROM, etc.) coupled with bus 210 for storing static information and instructions for processor 201. Computer system 200 may also contain an optional display device 205 coupled to bus 210 for displaying information to the computer user. Moreover, computer system 200 also includes a data storage device 204 (e.g., disk drive) for storing information and instructions. In one embodiment of the present invention, data storage device 204 is a cache memory.

Also included in computer system 200 of FIG. 2 is an optional alphanumeric input device 206. Input device 206 can communicate information and command selections to central processor 201. Computer system 200 also includes an optional cursor control or directing device 207 coupled to bus 210 for communicating user input information and command selections to central processor 201. Computer system 200 also includes signal communication interface 208, which is also coupled to bus 210, and can be a serial port.

A System and Method for Determining a File System Layout

The present invention provides a system and method for determining a file system layout on a disk. In particular, embodiments in accordance with the present invention provide a graphical user interface (GUI) for modifying a default file system layout provided during the installation of an operating system. The GUI of the present invention creates a file system layout "profile" that is used by the installation software to physically partition a disk (or a plurality of disks) according to the specifications of the "profile" created using the GUI. In accordance with embodiments of the present invention, the default file system layout provided during installation of the operating system comprises a root partition, a swap partition and a plurality of unassigned partitions.

Furthermore, the present invention allows preservation of partitions on a disk from a previous file system layout. Beneficially, partitions from a previously used disk can be preserved when installing a new operating system on a disk, thus providing flexibility over conventional file system layout tools. Advantageously, embodiments of the present invention provide a graphical system for modifying a file system layout, including preserving partitions from a previous file system layout and modifying partition sizes in both megabyte and cylinder mode.

Figure 3:
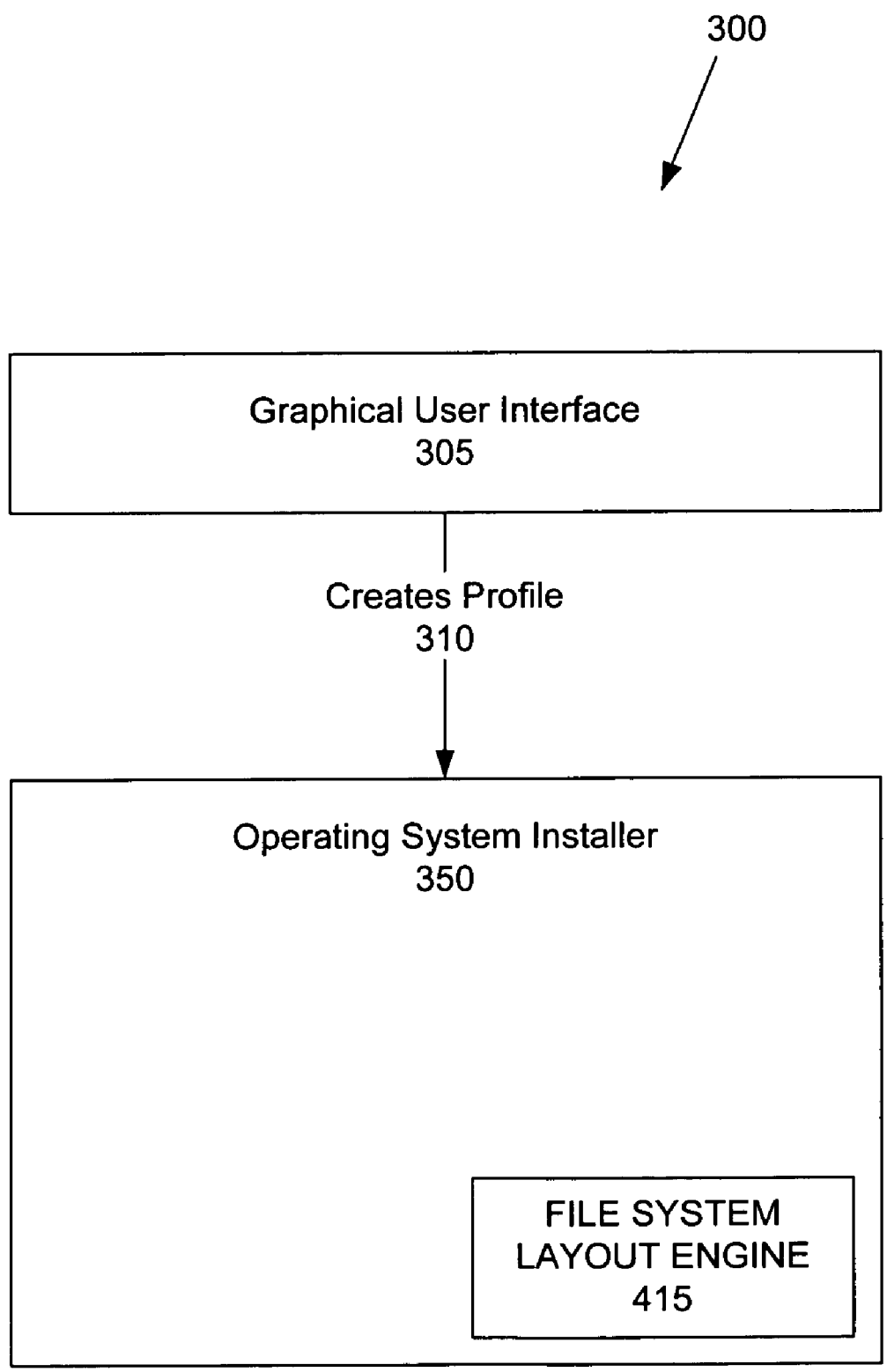
FIG. 3 is a block diagram of an exemplary system comprising a graphical user interface for determining a file system layout in accordance with embodiments of the present invention.

FIG. 3 is a block diagram of an exemplary system for determining a file system layout in accordance with embodiments of the present invention. During the installation of an operating system, a default file system is provided. In accordance with embodiments of the present invention, the default file system comprises a root partition, a swap partition and a plurality of unassigned partitions. The size of the partitions is dependent on the size of the disk available and on the software installed. A disk can have up to eight slices of various sizes and it is appreciated that one or more slices may not be used. It is appreciated that the present invention can be used to determine a file system layout on a single device or can be used to determine a file system layout on a plurality of devices (e.g., two disk drives). Once the default file system is provided to the user, the user has the option to modify the default file system, for example, preserve data on one or more disks.

Many times an operating system is installed on a device (e.g., a disk drive) that contains data, wherein a user desires to preserve a portion of the data on the disk (e.g., a partition). In accordance with embodiments of the invention, a partition on a disk can be preserved and included in the modified file system layout. It is appreciated that one may preserve a single slice on a disk, or any number of slices on any number of disks.

Exemplary system 300 includes a graphical user interface 305 for modifying a default file system layout and for creating a file system layout profile 310. The file system layout profile 310 is used by a file system layout engine 415 to physically create a file system layout on a disk. Graphical user interface 305 provides a graphical representation of a disk that can be viewed and modified in both megabytes and cylinders. Advantageously, the present invention provides a method for consistently rounding when converting between cylinders and megabytes to avoid overlapping partitions and unused space between partitions.

Figure 4:
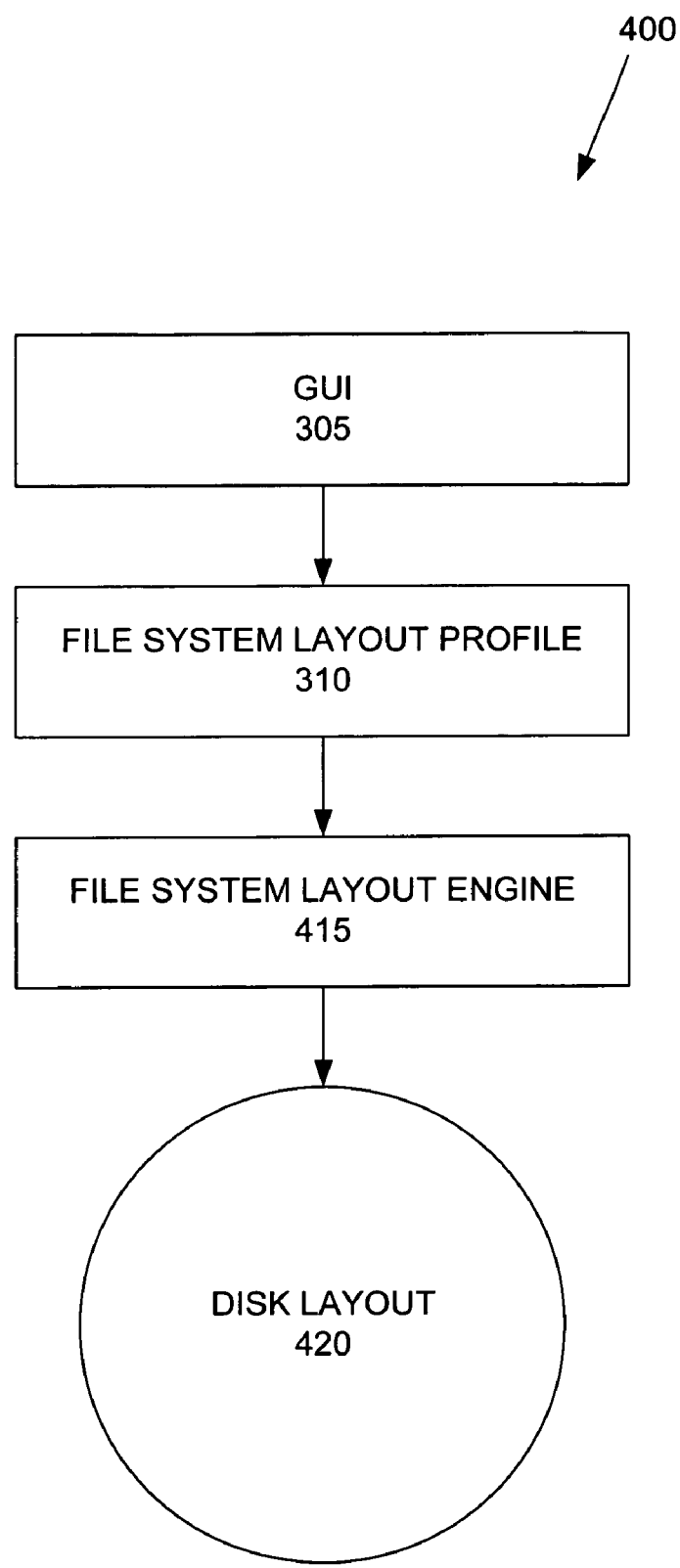
FIG. 4 is a block diagram of an exemplary system for determining a file system layout on a disk in accordance with embodiments of the present invention.

FIG. 4 is an illustration of an exemplary system for determining a file system layout profile using a graphical user interface in accordance with embodiments of the present invention. As stated above, a graphical user interface 305 can be used to modify a default file system layout provided during installation of an operating system. The graphical user interface 305 creates a file system layout profile 310 that provides instructions to a file system layout engine 415 that physically constructs a file system on a disk 420. In accordance with an embodiment of the invention, the file system layout engine 415 can be part of the installation software used to install an operating system on a disk (e.g., an installation wizard for an operating system). It is appreciated that file system layout engine 415 can be on a remote computer system that is in communication with a host computer system via a communication link (e.g., the Internet). For example, file system layout engine can be an online operating system installation wizard.

The graphical user interface 305 provides a graphical representation of the disk before the disk is physically altered. As a benefit, a user can quickly change, arrange and modify the size and location of slices on the disk. In addition, a slice can be preserved on one or more disks from a previous file system layout. In accordance with embodiments of the invention, when a slice is preserved on a disk, the slice remains in the same location on the disk, with its data intact.

The GUI of the present invention provides for addition of slices, deletion of slices and modification to the size of a slice for a file system layout on a disk. It is appreciated that the present invention uses cylinders for internal calculations of partition size and to physically partition a disk. It is also appreciated that the present invention provides sizes in megabytes as a feature of the graphical user interface for increased usability. If changes are made to the default file system layout in megabyte mode, the sizes must be internally converted to cylinders and the start cylinders for each slice must be recalculated (except for a preserved slice, wherein the start cylinder and size are maintained). When changes are made in cylinder mode, the conversion to megabytes is maintained to display the appropriate amount of disk space used/free on the GUI.

In accordance with embodiments of the invention, when converting from megabytes to cylinders, the present invention uses the smallest number of cylinders possible to represent a number of megabytes as long as the number of megabytes remains the same. When converting from cylinders to megabytes, the larger number of megabytes is used so as not to mislead the user of available space on the disk. This conversion scheme provides consistent rounding and insures there will not be overlapping cylinders on the disk.

In addition to consistent rounding, the present invention provides method for assigning partitions to available space on a disk using a best-fit process to layout the file system on the disk in the most efficient way. The present invention arranges the slices from largest to smallest and assigns start cylinders to the slices from the largest to the smallest, with the exception of the swap slice. The swap slice is always assigned first, even if it is not the largest partition. After assigning the swap slice, a vector of available space is examined for a space large enough to hold the largest partition remaining. The remaining partitions are assigned to free space from largest to smallest wherein slices are assigned a start cylinder such that a slice ends at the end of an available space (e.g., back filling the available space).

Figure 5:
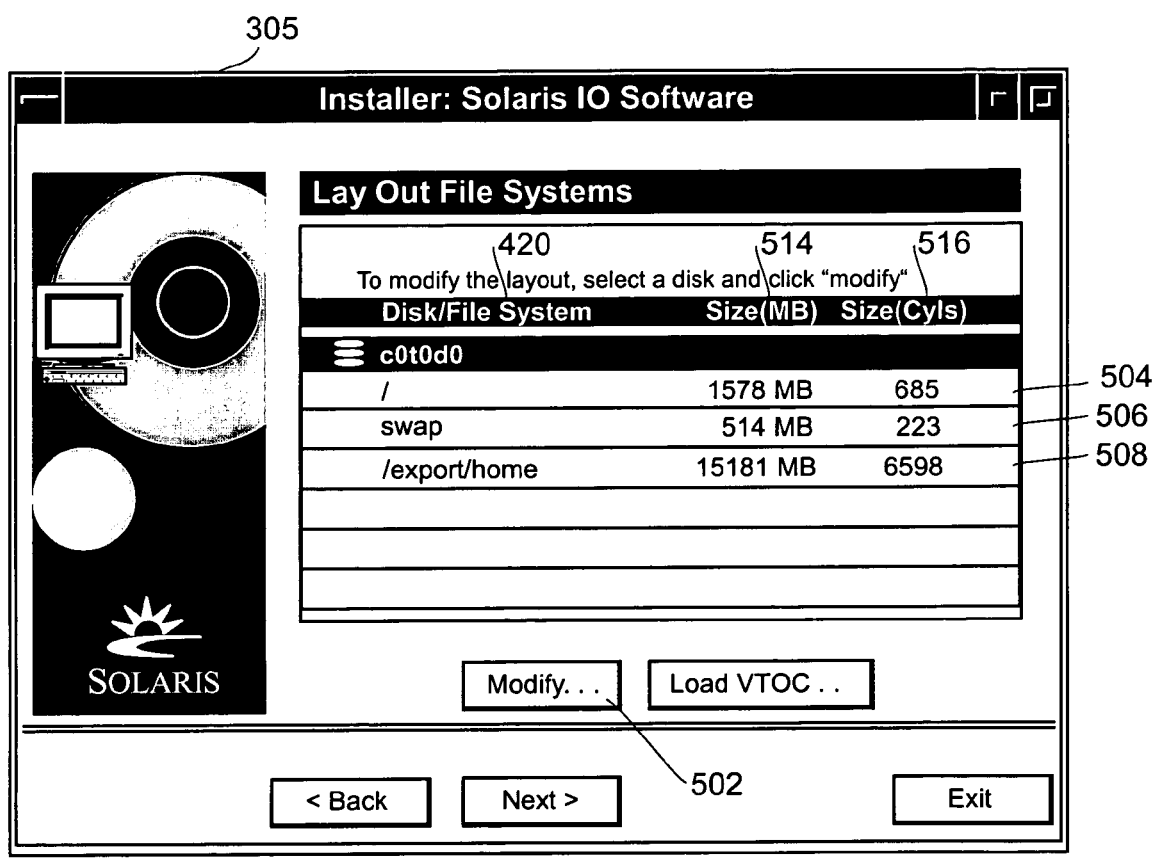
FIG. 5 is an illustration of an exemplary graphical user interface for modifying a default file system layout in accordance with embodiments of the present invention.

FIG. 5 is an illustration of an exemplary graphical user interface 305 in accordance with embodiments of the present invention. Graphical user interface 305 provides a graphical representation of partitions created on disk 420. The GUI 305 provides the size of the slices in both megabytes 514 and cylinders 516. The exemplary default file system comprises a root partition 504, a swap partition 506, and an /export/home partition 508. It is appreciated that the default file system can comprise any number of partitions, and in accordance with embodiments of the invention, the default file system comprises a root partition and a swap partition.

The default file system layout for disk 420 can be modified by selecting the "modify" button 502. Advantageously, a file system layout can be modified in both cylinders and megabytes, according to the user's preference. In accordance with embodiments of the invention, the size of a partition that is measured in megabytes is converted to a minimum number of cylinders (as long as the size in megabytes does not change) to maintain consistent rounding. For example, the size of root slice 504 is 1578 megabytes and can be converted to 685 cylinders. If the conversion calculated that 1578 megabytes was equivalent to 685.5 cylinders, the cylinders would be rounded down to 685 to prevent overlapping partitions of the disk when physically partitioned. It is important to convert between megabytes and cylinders accurately, because any rounding errors could result in overlapping partitions, thus causing failure during the physical layout of the disk. In accordance with embodiments of the invention, rounding the number of megabytes to a minimum number of cylinders provides consistent rounding, thus preventing overlapping partitions.

Figure 6:
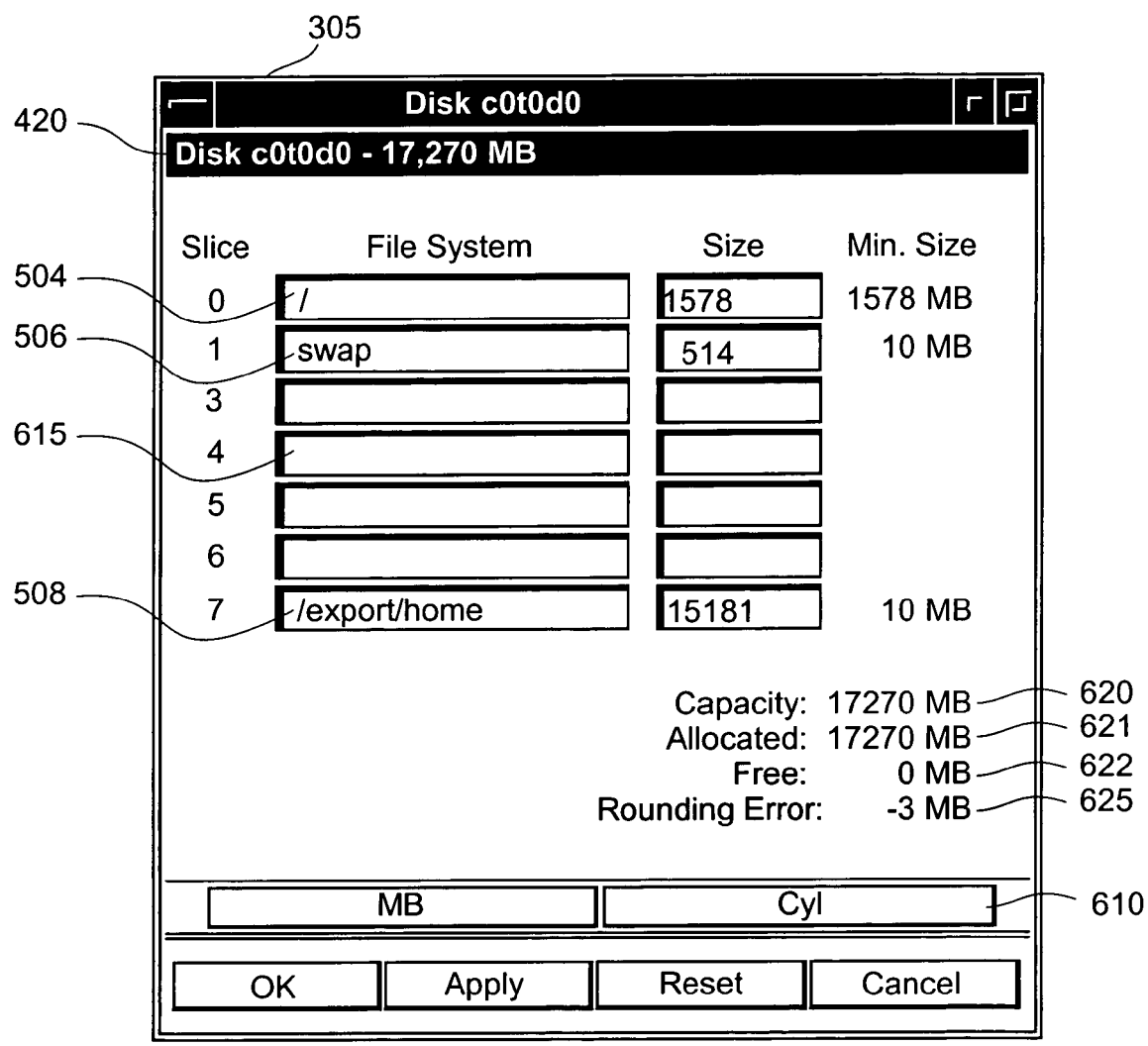
FIG. 6 is an illustration of an exemplary graphical user interface for modifying a file system layout in megabytes in accordance with an embodiment of the present invention.

FIG. 6 is an illustration of an exemplary graphical user interface 305 providing modification to a default file system layout in megabyte mode in accordance with embodiments of the invention. As stated above, a disk can have up to eight slices, beginning with slice zero. In accordance with embodiments of the invention, the first slice (e.g., slice zero) is reserved for the root partition. FIG. 6 illustrates root partition 504 with a size of 1578 megabytes located in slice zero of disk 420. If another partition is preserved from a previous file system layout, wherein that partition was located in slice zero, the root partition would be assigned another slice on the disk.

FIG. 6 also includes a plurality of unused slices that can be partitioned on the disk according to the desired file system layout. The unused slices (e.g., slice four 615) can be named and sized using the GUI. The unused slices can be sized in both megabytes and cylinders, according to user preference. The GUI displays the capacity 620 of the disk in megabytes. It is appreciated that when in cylinder mode, sizes are displayed in cylinders. Also displayed in the GUI are the amount of allocated space 621 and the amount of free space 622. When in megabyte mode, a rounding error 610 is also calculated to alert the user of the error associated with rounding down the number of cylinders associated with an amount of space in megabytes. Beneficially, rounding down the number of cylinders provides a consistent rounding, thus reducing layout failures associated with errors such as overlapping slices. As a result of the rounding, a small error is incurred and displayed on the GUI. Rounding error occurs in megabyte mode only because the internal calculations and the physical layout of the disk are done in cylinders. Conventional file system layout systems do not provide for modifying a layout when slices are preserved in megabytes because of problems associated with converting cylinders to megabytes.

Advantageously, the present invention consistently rounds conversions between cylinders and megabytes, thus providing a system for modifying a file system layout in megabytes even when preserving slices on one or more disks. As stated above, when changes are made to the default file system layout in megabytes, the sizes must be converted to cylinders and the start cylinders for each slice must be recalculated (except for a preserved slice, wherein the start cylinder and size are maintained). When changes are made in cylinders, the conversion to megabytes is maintained to display the appropriate amount of disk space used/free. When converting from megabytes to cylinders, the present invention uses the smallest number of cylinders possible to represent a number of megabytes as long as the number of megabytes remains the same. When converting from cylinders to megabytes, the larger number of megabytes is used so as not to mislead the user of available space.

Figure 7:
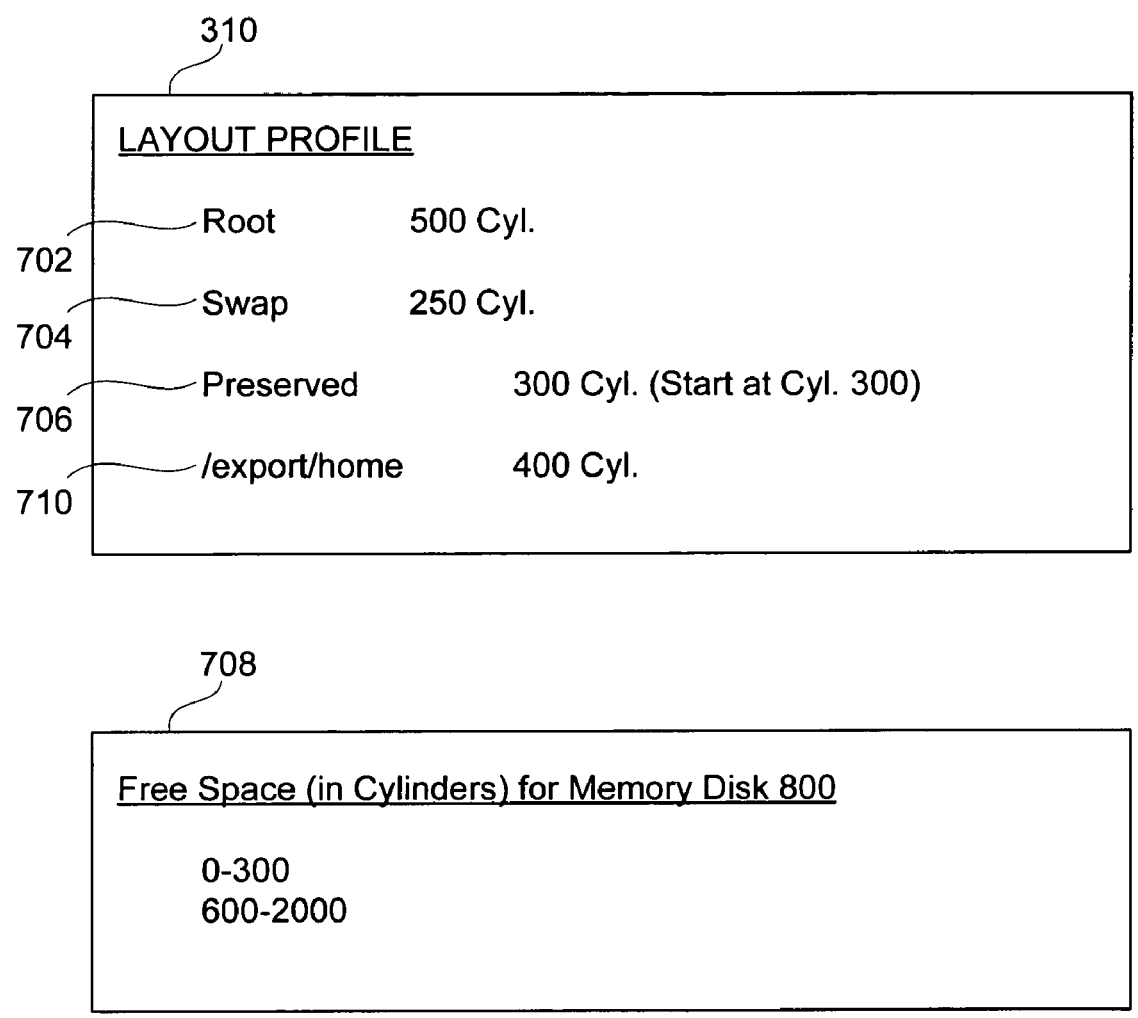
FIG. 7 is an illustration of an exemplary file system layout profile in accordance with embodiments of the present invention.

FIG. 7 is an illustration of an exemplary file system layout profile 310 and an exemplary free space profile 708 in accordance with embodiments of the present invention. After a default file system has been modified in the GUI, a file system layout profile 310 is provided to the operating system installer to instruct the installer how to physically layout the disk. Layout profile 310 of FIG. 7 comprises a root partition 702 of 500 cylinders, a swap partition 704 of 250 cylinders, a preserved slice 706 of 300 cylinders (with a start cylinder of 300), and an /export/home partition 710 of 400 cylinders. The preserved slice has a specific start cylinder because the preserved partition 706 retains its original location on the disk and its original size prior to modification of the file system layout. Once the profile 310 is produced, a free space profile 708 is provided to map space available on the disk (e.g., free space vector). The free space profile 708 corresponds to an exemplary disk 800 of FIG. 8 before any physical changes to the disk are made. As each partition is assigned to a free space on the disk, a vector of used space is determined and from that, a vector of available space is calculated. The free space profile is updated after each partition is assigned to a location on the disk. These vectors contain ranges of cylinders where a section of space is used/available. The vectors are re-calculated after each partition is assigned to a location on the disk. It is appreciated that free space profile 708 is exemplary and changes after each partition is assigned to the disk.

The free space profile 708 specifies free disk space on disk 800 from FIG. 8 from cylinder 0 to cylinder 300 and free space from cylinder 600 to cylinder 2000. The space between cylinder 300 and cylinder 600 is not available because the preserved partition 706 specified in the layout profile 310. After the first partition is assigned to the disk, the values in the free space profile 708 will be altered to reflect the addition of a partition to the disk (e.g., less free disk space).

When a default file system is created, and the beginning cylinders are free, the default file system layout will attempt to locate the swap slice 704 and the root slice 702 at the beginning of the disk. If a partition is preserved, and the beginning of the disk is not available (e.g., used), the root partition and swap partition will be located elsewhere on the disk. As stated above, the exemplary file system layout profile 310 of FIG. 7 specifies a root partition of 500 cylinders, but the first available free space on the disk is only 300 cylinders (as stated in the free space profile 708 of FIG. 7). As a result, the root slice 702 will be assigned another available space on the disk.

Table 1 is an exemplary pseudo code for assigning swap in accordance with an embodiment of the present invention.

TABLE 1

If swap is not preserved, the following exemplary logic is used to assign a location for swap.
Try to put swap starting at cylinder 0 on suitable s1 on the current rootdisk;
Try to put swap starting at cylinder 0 on suitable s1 on other selected disk;
Try to put swap on suitable s1 on the current rootdisk;
Try to put swap on suitable s1 on the other selected disk;
Try to put swap starting at cylinder 0 on suitable s3+ on the current root disk;
Try to put swap starting at cylinder 0 on suitable s3+ on other selected disk;
Try to put swap starting at cylinder 0 on suitable s0 on the current rootdisk;
Try to put swap starting at cylinder 0 on suitable s0 on the other selected disk;
Try to put swap on any suitable slice on the current root disk;
Try to put swap on any suitable slice on any selected disk;
If still no suitable slices, use any.

* Where suitable means large enough and not preserved and cyl 0 means first cylinder to use on the disk.

Table 2 is an exemplary pseudo code for assigning slash in accordance with an embodiment of the present invention.

TABLE 2

Try to put slash on suitable s0 on the current rootdisk;
Try to put slash on suitable s0 on the other selected disk;
Try to put slash on any suitable slice on the current rootdisk;
Try to put slash on any suitable slice on the other selected disk;
If still not found, use any.

Figure 8A:
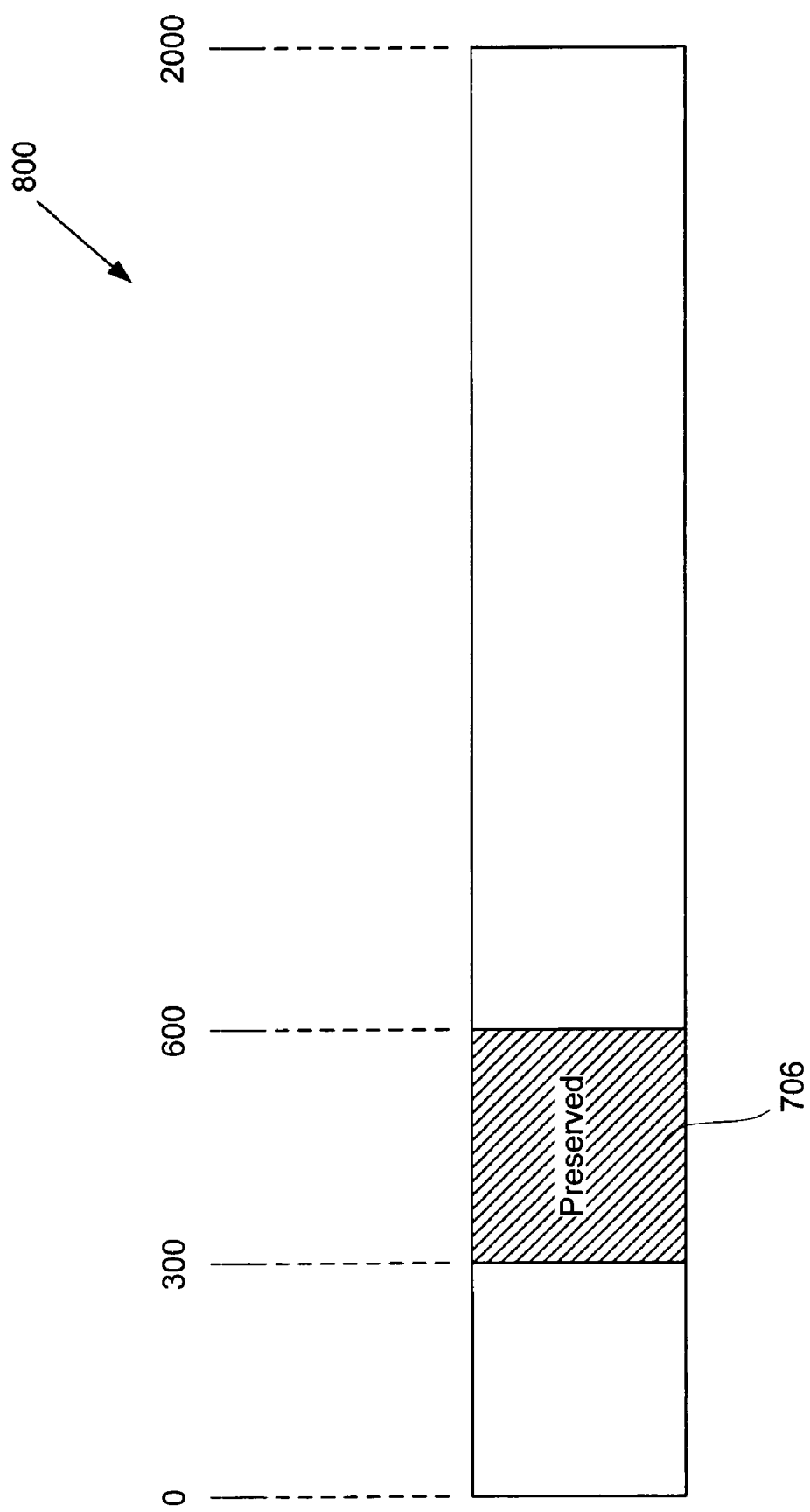
FIG. 8a is an illustration of an exemplary disk comprising a preserved partition in accordance with an embodiment of the present invention.

FIG. 8a is an illustration of an exemplary disk comprising a preserved partition and available space in accordance with embodiments of the present invention. Exemplary disk 800 is illustrated linearly for clarity and in one embodiment of the invention, disk 800 comprises circular partitions. Exemplary disk 800 comprises a preserved partition that starts at cylinder 0, a first free space that starts at cylinder 300 and a second free space that starts at cylinder 600. The free space profile 708 of FIG. 7 corresponds to the physical layout of disk 800.

After free space has been located on the disk 800, the partitions defined in the layout profile 310 are assigned to the free space (specified by the free space vector). Before the partitions are assigned to the disk, they are sorted from largest to smallest, with the exception of the swap partition. The swap partition is always assigned to a free space on the disk first, regardless if it is the largest partition. For example, when sorting the partitions in layout profile 310, the order would be first, swap partition 704, then second, root partition 702, then lastly, /export/home partition 710. The preserved partition 706 is not included because the location and size are preserved on the disk and as such are already assigned. The partitions are assigned such that the partition ends at the end of an available partition, with the exception of the swap partition. The swap partition is assigned such that it starts at the beginning of an available space partition.

Table 3 is an exemplary vector of used and available space on a disk in accordance with embodiments of the present invention.

TABLE 3

A disk with cylinders 0–8432 has a vector of used space of:
451–799
1426–3677
This results in the following vector of available space:
0–450
800–1425
3678–8432
This implies that slices can be assigned in any of the free space ranges. If a 100 cylinder slice is assigned starting at cylinder 8333, the new used vector is:
451–799
1426–3677
8333–8432
and the new available vector would show:
0–450
800–1425
3678–8332

Figure 8B:
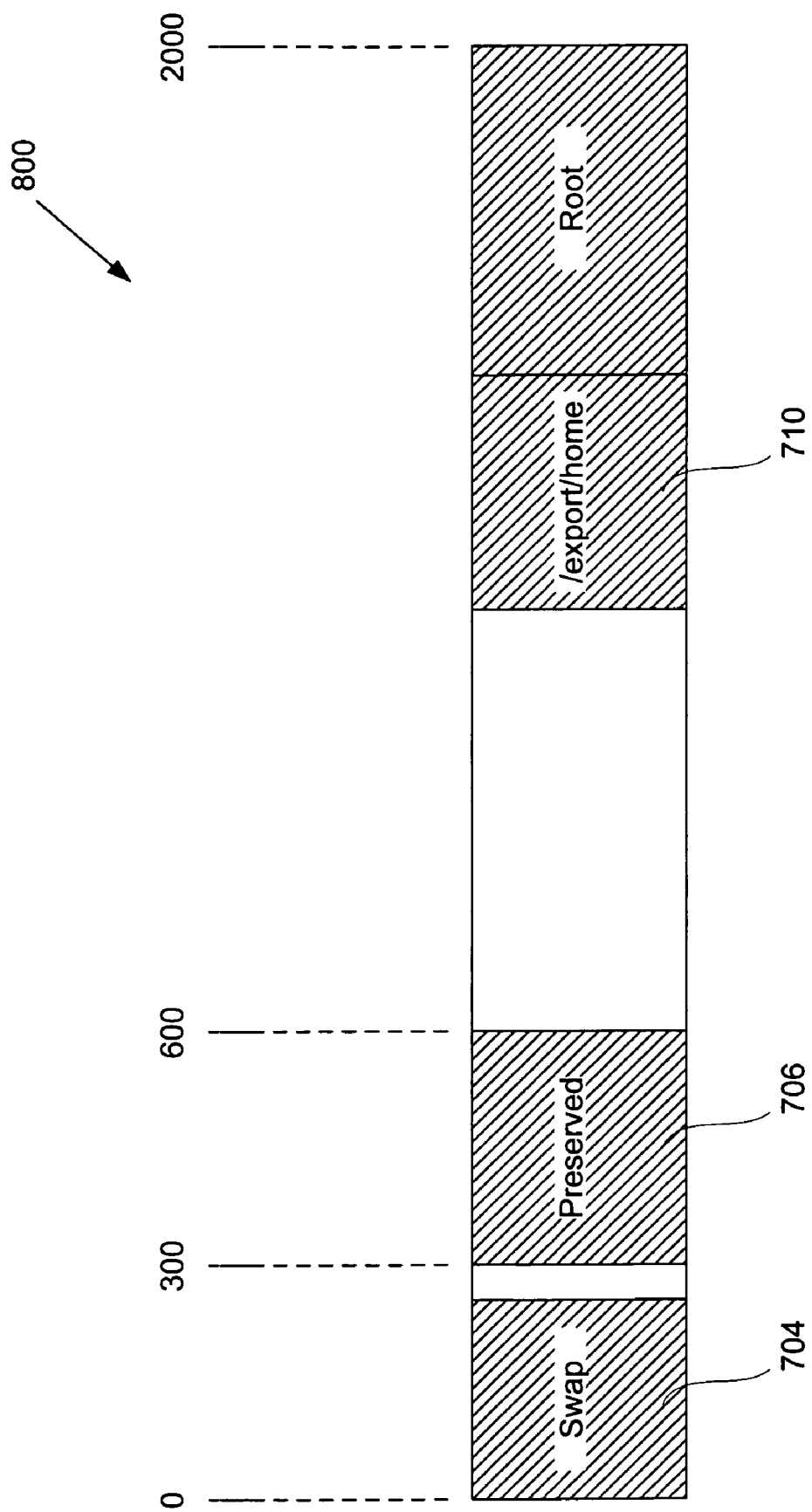
FIG. 8b is an illustration of an exemplary disk comprising a plurality of assigned partitions in accordance with embodiments of the present invention.

FIG. 8*b* is an illustration of exemplary disk 800 after the partitions defined in layout profile 310 of FIG. 7 have been assigned to the free space partitions on the disk. The swap partition 704 is assigned first to the disk and starts at the beginning of the available space partition. It is desirable to locate the swap slice at the beginning of the disk to increase performance of the swap partition (e.g., faster data retrieval). An available free space of size 300 cylinders was available at the beginning of the disk 800 (as defined in free space profile 709 of FIG. 7), and as a result, the swap partition (size of 250 cylinders) was assigned to the beginning of that space. After the swap partition is assigned, the root partition is assigned because it is the largest of the remaining partitions. The root partition is located such that the end of the root partition terminates at the end of the available free space. Lastly, the /export/home partition 710 is assigned to a free space partition. In accordance with an embodiment of the invention, a partition is assigned to the first available space partition large enough to accommodate the partition (e.g., first large enough from beginning of the disk to end of the disk). It is appreciated that partitions can also be assigned such that the largest partition is assigned to the largest available partition (e.g., largest partition assigned to largest available space partition on the disk).

Figure 9:
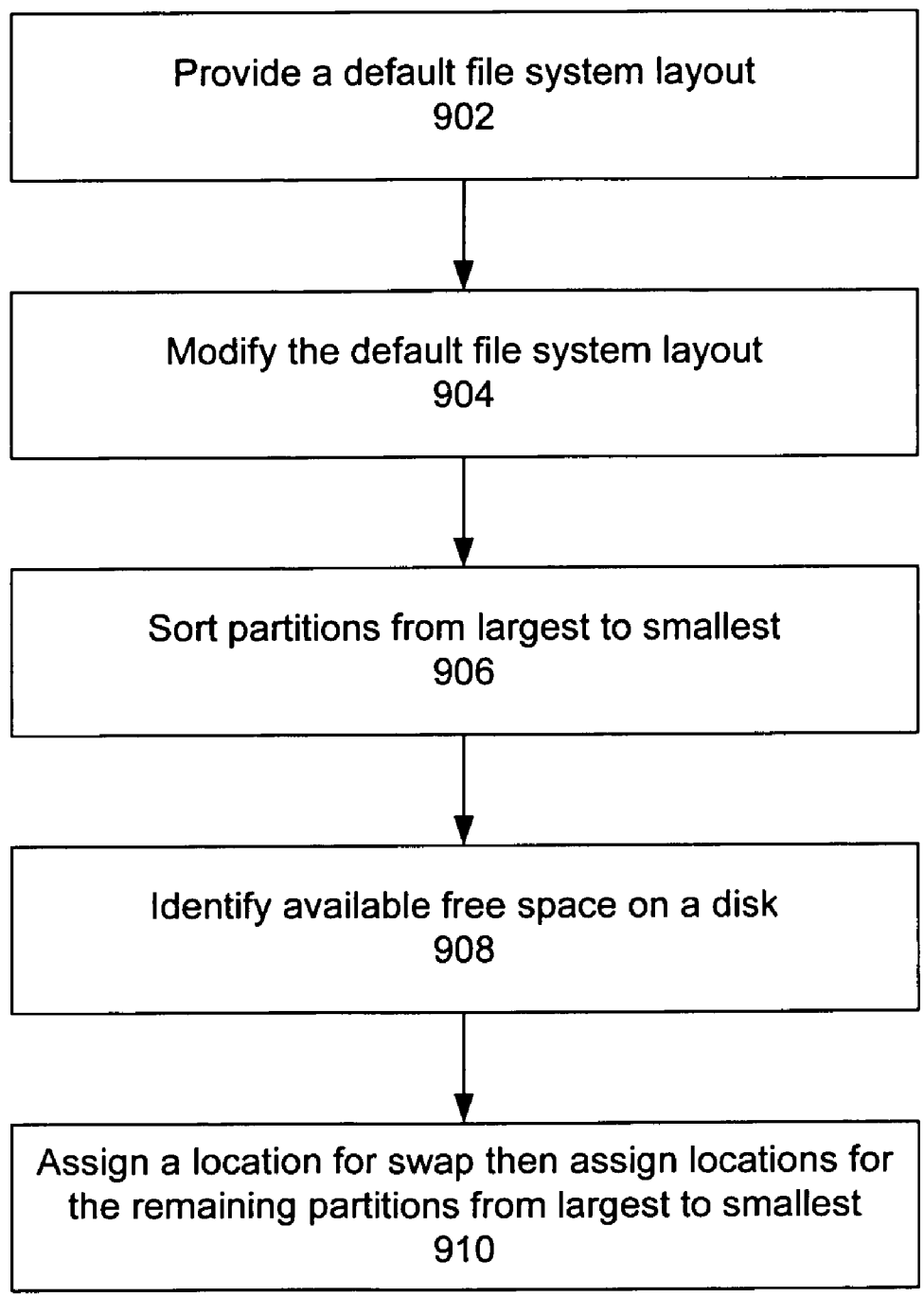
FIG. 9 is a flow diagram of an exemplary process for determining a file system layout in accordance with embodiments of the present invention.

FIG. 9 is a flow diagram of an exemplary computer process 900 for determining a file system layout in accordance with embodiments of the present invention. Process 900 begins with step 902 wherein a default file system is provided. As stated, the default file system provided comprises a root partition, a swap partition and a plurality of unassigned partitions. Once the default file system is provided, the next step 904 is to modify the default file system layout. As stated, the default file system can be modified in both cylinders and megabytes. Since all internal calculations are done in cylinders, a rounding scheme is implemented to keep rounding consistent to prevent overlapping partitions. Beneficially, the present invention provides modification to the file system layout in both megabytes and cylinders, even if a partition is preserved.

After the default file system is modified, the partitions are sorted from largest to smallest, with the exception of the swap partition in step 906. As stated, the swap partition is always assigned to the disk first (wherein the start of swap is at the beginning of an available space partition). The next step 908 is to identify available free space on the disk. As stated above, as each partition is assigned, a vector of used space is determined and from that, a vector of available space is calculated. These vectors contain ranges of cylinders where a section of space is used/available. If no partitions are preserved, the whole disk should be free, but if partitions are preserved, the locations of the preserved partitions are retained and are considered used. Once the locations of available space on the disk are determined, partitions are assigned to available areas of free space from largest to smallest. As stated, the partitions can be assigned to the first available space large enough for the partition, or they can be assigned such that the largest partition is assigned to the largest available space slice.

Embodiments of the present invention, a system and method for determining a file system layout have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for determining a file system layout for installation of a file system on a disk comprising:
   a) providing a default file system layout comprising a root partition, a swap partition and a plurality of unassigned partitions;
   b) assigning a size for each of said partitions;
   c) sorting said partitions by said size assigned in said b) from largest to smallest;
   d) identifying available free spaces on said disk for said unassigned partitions;
   e) assigning locations on said disk for said partitions from said largest to said smallest wherein said partitions are filled in said available free spaces identified in said d) from end to beginning of said available free spaces; and
   f) identifying a preserved partition, wherein said preserved partition retains a location and a size, and wherein the assigned size for each of said partitions is capable of being modified in either one of byte size or cylinder size, and enabling converting between byte size and cylinder size by implementing appropriate rounding adjustments before proceeding to the installation of the file system on the disk.

2. The method as described in claim 1 wherein said byte size is megabytes.

3. The method as described in claim 2 wherein the converting enables converting from cylinders to megabytes or megabytes to cylinders.

4. The method as described in claim 3 wherein said size converted to megabytes is rounded to a minimum number of megabytes represented by said size measured in cylinders without changing the number of megabytes.

5. The method as described in claim 1 further comprising providing a graphical user interface for completing said b).

6. The method as described in claim 1 wherein said swap partition is assigned to one of said available free spaces.

7. In a computer system comprising a processor coupled to a bus and a memory coupled to said bus, a computer readable medium comprising instructions that when executed implement a method of determining a file system layout for installation of a file system on a disk said method comprising:
   a) providing a default file system layout comprising a root partition, a swap partition and a plurality of unassigned partitions;
   b) assigning a size for each of said partitions;
   c) sorting said partitions by said size assigned in said b) from largest to smallest;
   d) identifying available blocks of free space on said disk for said unassigned partitions;
   e) assigning locations on said disk for said partitions from said largest to said smallest wherein said partitions are filled in said available blocks identified in said d) from end to beginning of said available blocks; and
   f) identifying a preserved partition, wherein said preserved partition retains a location and a size, wherein the assigned size for each of said partitions is capable of being modified in either one of byte size or cylinder size, and enabling converting between byte size mode and cylinder size mode by implementing appropriate rounding adjustments before proceeding to the installation of the file system having the file system layout on the disk.

8. The computer readable medium as described in claim 7 wherein said byte size is megabytes.

9. The computer readable medium as described in claim 8 wherein converting enables converting from cylinders to megabytes or megabytes to cylinders.

10. The computer readable medium as described in claim 9 wherein said size converted to megabytes is rounded to a minimum number of megabytes represented by said size measured in cylinders.

11. The computer readable medium as described in claim 7 wherein said method further comprises providing a graphical user interface for completing said b).

12. The computer readable medium as described in claim 7 wherein said swap partition is assigned to the beginning of said disk.

* * * * *